Dec. 18, 1934. T. W. C. BEATTIE 1,984,720
PIPE WELDING APPARATUS
Filed June 11, 1931 4 Sheets-Sheet 1
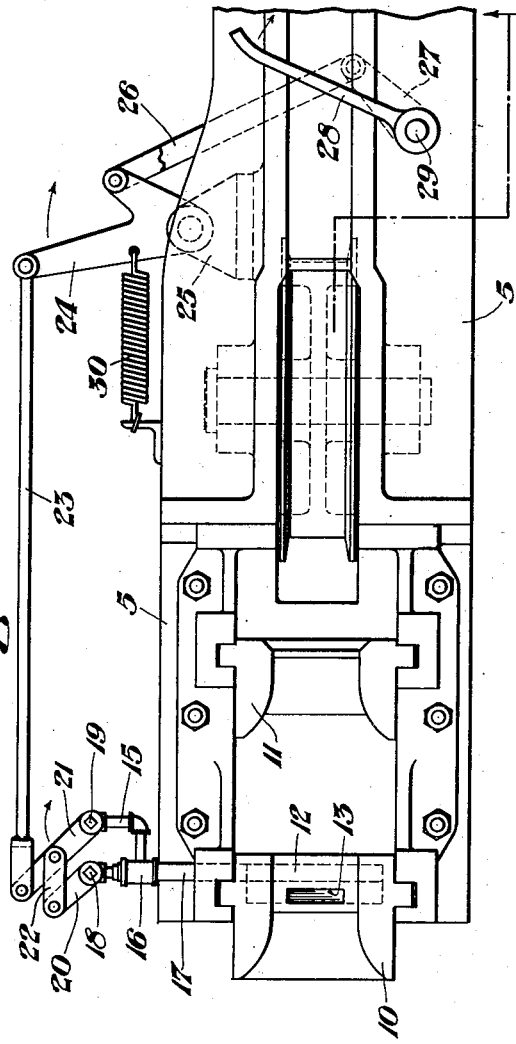
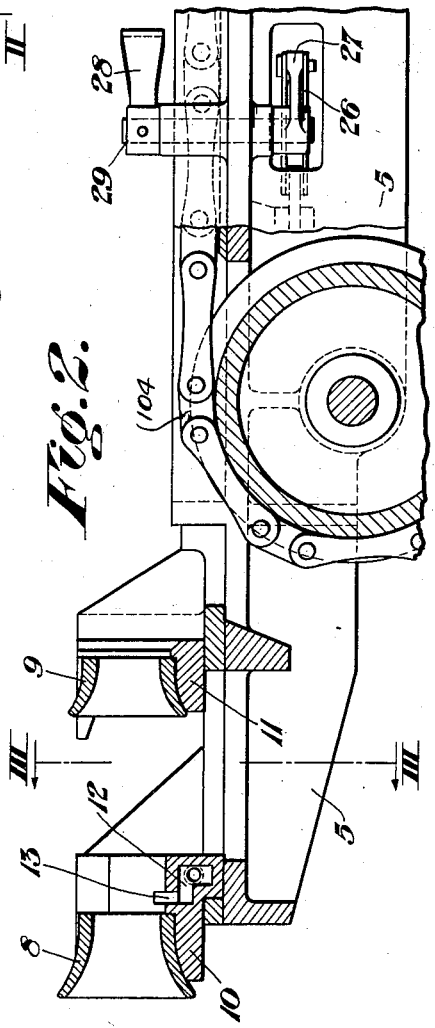
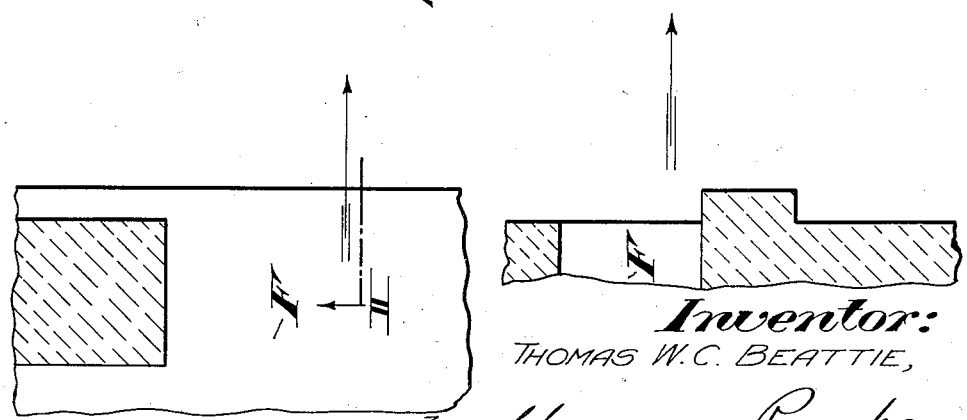
Inventor:
THOMAS W. C. BEATTIE,
by Usina & Rauber
his Attorneys.

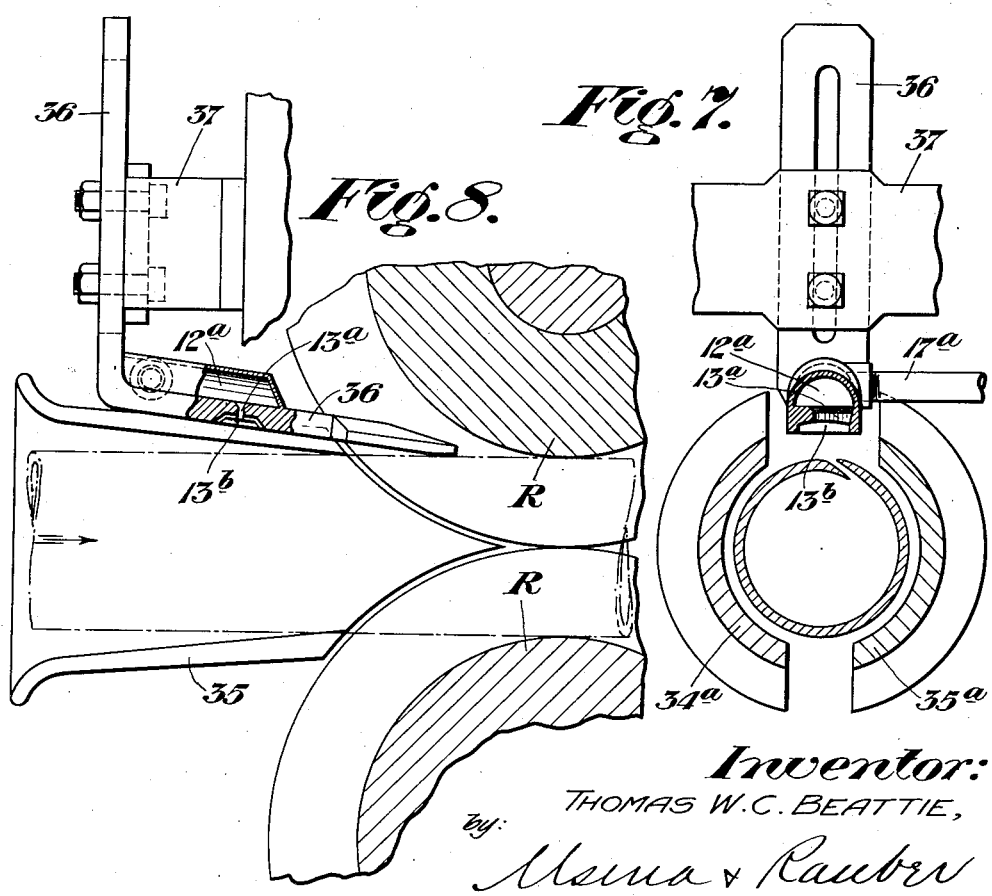

Dec. 18, 1934.   T. W. C. BEATTIE   1,984,720
PIPE WELDING APPARATUS
Filed June 11, 1931    4 Sheets-Sheet 3
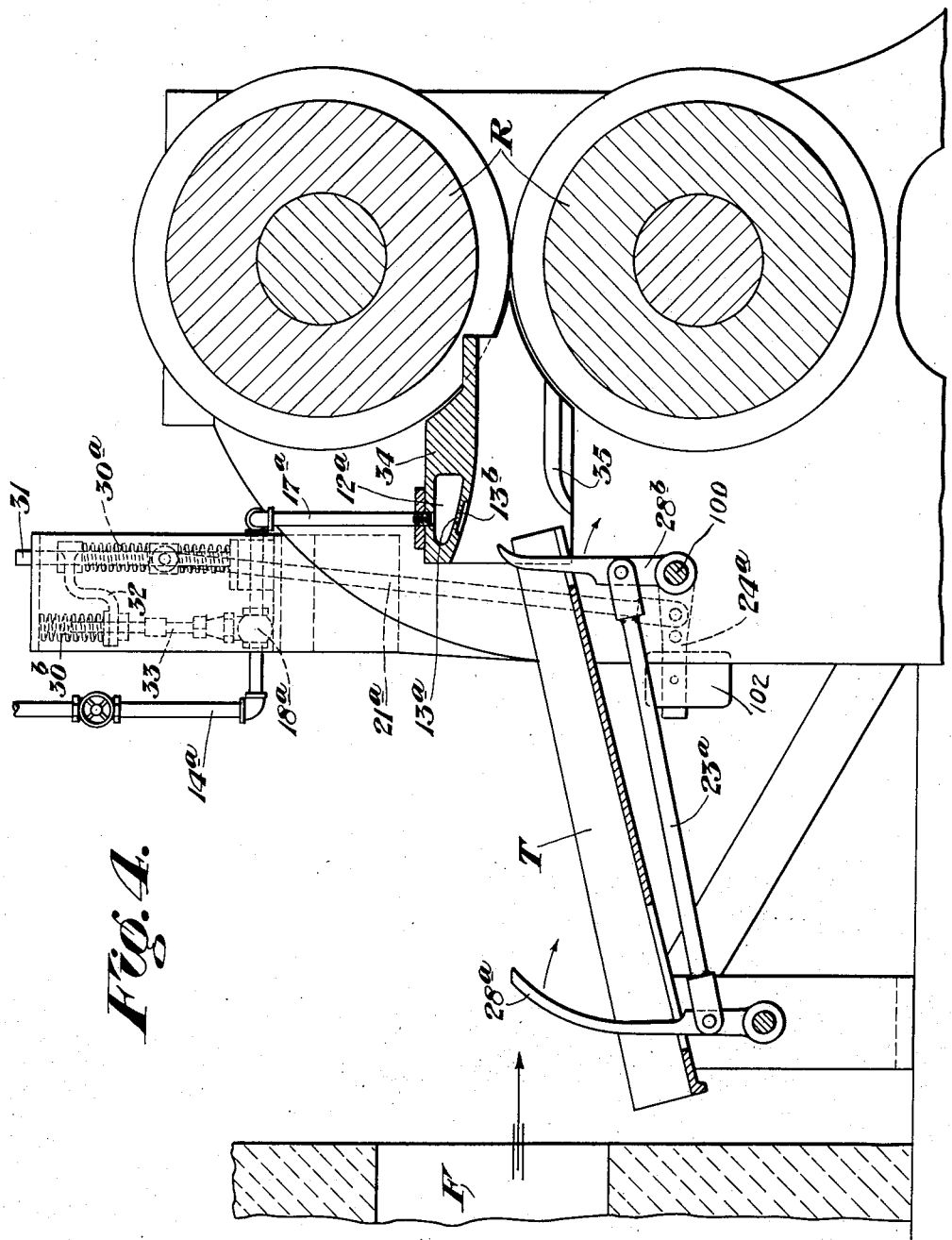

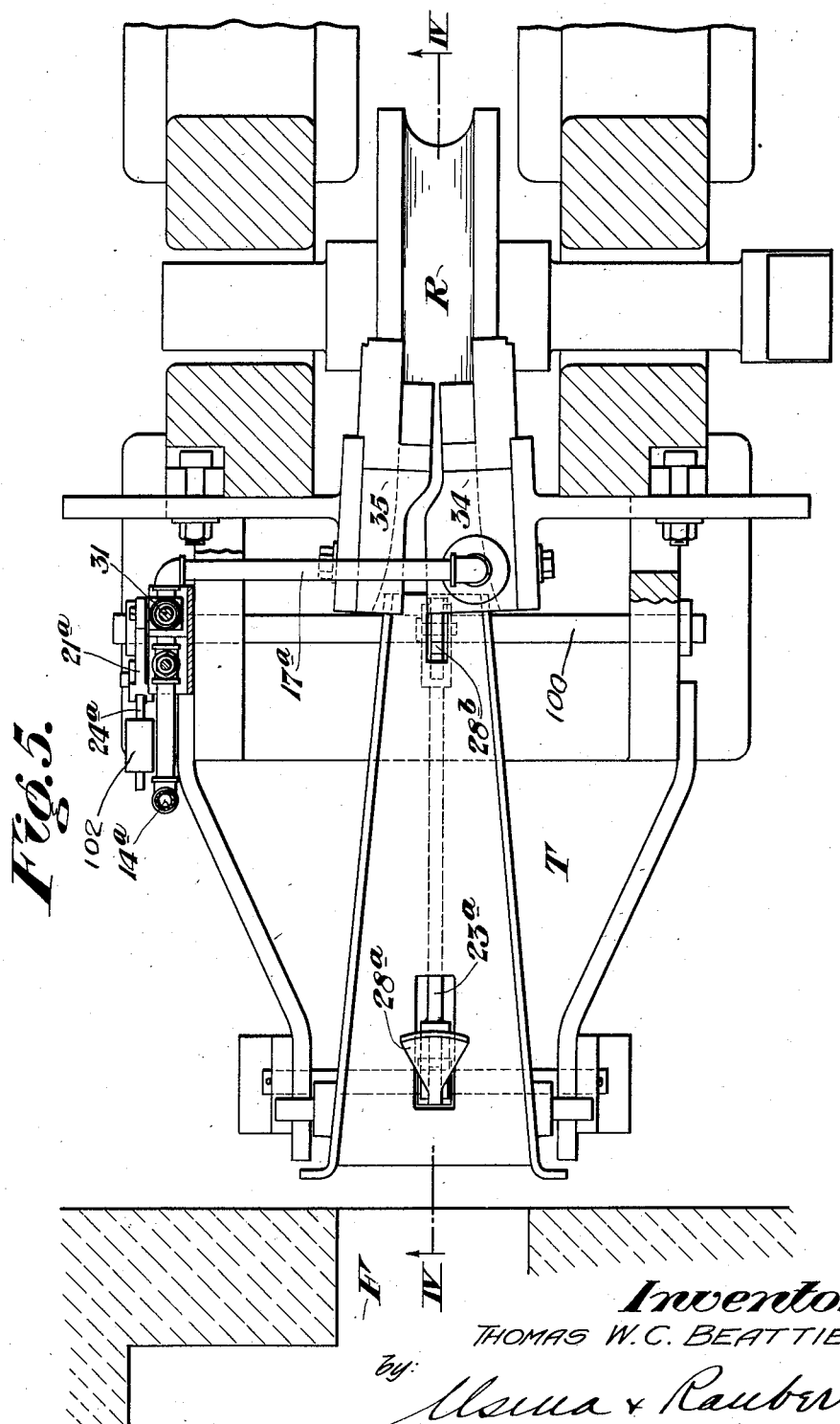

UNITED STATES PATENT OFFICE 1,984,720

PIPE WELDING APPARATUS

Thomas W. C. Beattie, Pittsburgh, Pa., assignor to National Tube Company, a corporation of New Jersey Application June 11, 1931, Serial No. 543,688

14 Claims. (Cl. 205—9)

This invention relates to the manufacture of welded tubing and has for its principal object to improve upon and simplify the well-known processes for producing tubular products by heating a strip of metal or skelp in a furnace and then feeding it through bending dies and welding rolls over a mandrel, or gripping the skelp by draw-bench tongs and pulling it through bells or dies, the edges of the tube being heated and welded while passing through said rolls or dies.

The present process and apparatus are adaptable to the manufacture of both lap-weld and butt-weld tubing. In butt-welding, for example, the skelp is drawn from the furnace by gripping tongs in the usual manner, the bells or dies being applied over the tongs after gripping the skelp and the ends of the tongs reins then being engaged by the draw-bench chain, which causes the bells to move into the bell holders. The diameter or radius of the bending bell may be of such dimension that the edges of the skelp are forced together within the bell to such an extent that only the outer corners or seam keep apart for a short distance after leaving said bell. Heat or a bath of gas, such as oxygen or air, is directed against same. This eliminates the outside seam or a starting point rupture when the diameter or radius is such that it does not force the edges of the skelp together but keeps them apart for a short distance after leaving the said bell. A heating and cleansing flame or bath of gas, such as oxygen or air enriched with oxygen, is directed against the edges of the bent skelp from a slotted chamber immediately after passing through the bending bell. This insures a cleansing action and uniform and even heating of said edges, due to the size and location of the slot and the fact that it is of such width that there is no chance of the edges of the partly formed tube oscillating or moving out of range of the flame.

Immediately after the heating and cleansing bath is applied the edges come together. This minimizes the chances of foreign matter being blown on the edges of the skelp prior to being pressed together and welded and, furthermore, said edges are not subjected to any chilling or bearing action against the sides of the bell after being prepared by the bath of gas, as is often the case when the edges of the skelp are treated when the sheet is flat and prior to being drawn through the bending bell.

The bell or bells are held in the bell holders until the pipe has passed therethrough, after which they drop out and are preferably replaced by clean new bells for the next length of skelp to be drawn. The supply of gas or air and oxygen for cleansing and heating the edges of the skelp is controlled automatically by lever mechanism which includes an arm mounted in the path of travel of the tube.

The novel and advantageous features of the invention will become apparent in view of the following description taken in conjunction with the drawings, wherein Figure 1 is a plan view of apparatus embodying the features of the invention shown applied to a draw bench, only a part of the latter being shown—the apparatus in this instance being particularly adapted for butt-welding tubular products;

Figure 2 is a sectional view taken on the line II—II of Figure 1.

Figure 3 is a sectional view taken on the line III—III of Figure 2.

Figure 4 is a view in section and side elevation of a set of welding rolls and lap-welding apparatus embodying the features of the invention;

Figures 5 and 6 are sectional views taken, respectively, on the lines V—V and VI—VI of Figure 4;

Figure 7 is a view similar to Figure 6, showing a modification in structure;

Figure 8 is a fragmentary view in sectional side elevation of the parts shown in Figure 7.

First referring to Figs. 1, 2 and 3, the skelp is drawn from the furnace by means of the usual gripping tongs and pulled through bells or dies 8 and 9, which are preferably slipped over the tongs and pulled into position in bell holders 10 and 11, mounted on the draw bench 5. It will be understood that the bell 8 alone may be used, if desired.

The diameter or radius of the first or bending bell 8 may be such that it permits various widths of openings of the skelp edges, as desired, as the skelp is drawn therethrough, and the first bell holder 10 is formed with a chamber 12 which opens out in the form of a semi-circular slot 13 underneath the plane of travel of the partly formed tube after passing through the bell. The slot 13 surrounds the lower circumferential portion of the partly formed tube or bent skelp as it is pulled through the bells or dies, and proper clearance is permitted so as to prevent the edges or surface of the skelp from coming in contact with the walls of said slot.

A suitable heat or gas such, as oxygen or air enriched with oxygen, is supplied to the chamber 12 through pipes 14 and 15, which open into a chambered coupling union 16, the latter having a nozzle 17 connected thereto which communicates with said chamber. The pipe lines 14 and 15 are provided with valves 18 and 19 which have levers 20 and 21 connected thereto, these levers being in turn pivotally connected by a link 22. Both valves 18 and 19 and lines 14 and 15 are used only when gases are mixed. A connecting rod 23 is pivotally connected at one end to the lever 21 and at its opposite end to the one arm of a bell-crank lever 24, the latter being fulcrumed on a bracket 25, which is secured to the draw bench 5. The other arm of the lever is pivotally connected through the medium of levers 26 and 27 to an arm 28, which is pivotally mounted on the draw bench at 29. A spring 30 is connected at opposite ends, respectively, to the bell-crank lever 24 and the draw bench 5 and normally maintains the arm 28 across the draw bench.

When there is no skelp or pipe being drawn from the furnace through the bells or dies 8 and 9, the lever or arm 28 is held in position across the draw bench or line of travel of the pipe and the valves 18 and 19 are closed. When skelp is being pulled from the furnace the tongs and later the tube contact with the arm 28 and the valves are opened and gas is permitted to pass into the chamber 12. The welded tube passes out of contact with the arm 28 shortly after passing through the bending bell, or the second bell 9 if used, and the valves are closed, or substantially closed, it being understood that sufficient gas may be permitted to flow into said chamber to keep a flame alive.

The skelp is adapted to be drawn through the bells or dies 8 and 9 by the usual draw chain 104, shown clearly in Figure 2. The skelp is adapted to be seized by the usual tongs (not shown) and the tongs are then engaged with the draw chain 104 in the usual manner to pull the skelp through the dies or bells.

The foregoing construction embodies numerous advantages. The application of heat or gas, such as oxygen or air enriched with oxygen, is applied to the edges of the skelp after being bent by the bending bell 8 and not before bending, and the edges in passing over the slot 13 are not subjected to a jet or nozzle action but to a bath action which not only heats the edges but cleanses the latter. The slot is at a fixed distance from the bell and is of such width that the edges of the skelp have to pass thereover, thus eliminating any chance of untreated edge portions due to variation or oscillation from the line of travel and insuring uniform pressure and rise in temperature. It is well known in the art that the laps of bent skelp do not travel in the same line or path for each and every length, due to the welder not being able to always cause the skelp to hit in the same spot on the bell guides, mandrel or rolls and also due to warping of the skelp in the welding furnace. Immediately after the edges or portion of the edges of the skelp are subjected to the bath action of the gas they begin to close, due to the forcing of the edges together which may be done by the tension pull on the bent skelp by the tongs or by using a second bell and thus there is little chance of scale or foreign matter being blown on the edges.

Nor do the edges rub or bear against the bell after being heated and cleansed, as is the case when the edges are heated prior to bending or entering the bell.

The second bell or die 9 when used is spaced a suitable distance from the first bell and this bell is of such diameter as to force the edges of the tube together and weld same.

Figures 4, 5 and 6 show the features of the invention applied to lap-welding apparatus. The apparatus is shown disposed adjacent a welding furnace F, the usual welding rolls being indicated at R. In this instance the lever mechanism which controls the gas is mounted in cooperative relation with the apron T or bending die which receives the skelp from the furnace and guides it to the bell guides and rolls, the arms or levers which correspond to the arm 28 being indicated at 28$^a$ and 28$^b$, said arms being connected by rod 23$^a$. The arm or lever 28$^b$ is fixed to a shaft 100 which in turn carries a lever 24$^a$ having a counterweight 102 thereon. When the partly formed tube passes over arm 28$^a$ it opens valve 18$^a$ through the medium of pivoted lever 24$^a$, connecting rod 21$^a$, pin 31, springs 30$^a$ and 30$^b$, connecting bracket 32 and valve stem 33, the rod 21$^a$ being pivoted to pin 31 which is connected to bracket 32, the latter in turn being connected to valve stem 33, pin 31 and stem 33 moving upwardly against the resistance of springs 30$^a$ and 30$^b$. When the end of the tube passes over lever or arm 28$^b$, the latter is released and the said springs and the counterweight 102 cause the levers and valve stem to return to closed position. Pipe 14$^a$ is the supply line for a suitable gas, such as oxygen and air.

As the tube passes into the rolls the edges are brought into lapped relation over the mandrel by a pair of cooperating bell guards 34 and 35. The guard 34 is formed with a chamber 12$^a$ which opens out into a recess 13$^b$ through a slot 13$^a$. Gas is supplied to the chamber 12$^a$ through a pipe 17$^a$. The end of the bell guard 34 bears against and exerts pressure on the lap of bent skelp.

The foregoing construction gives the same advantages in lap-welding that are provided by the structure described in connection with Figures 1, 2 and 3 and which is particularly adapted for butt-welding, the bath of gas or oxygen, or air enriched with oxygen, being applied to the edges of the tube just prior to the welding operation.

Figures 7 and 8 show a modification in the bell guard construction illustrated in Figures 4, 5 and 6, this modified structure being particularly adapted for larger sizes of pipe. In this instance bell guards 34$^a$ and 35$^a$ are of semi-circular shape and spaced a suitable distance apart, and interposed between these guards is a welding member which may be termed a lip 36. The end of this lip 36 bears against the lap of bent skelp in place of the bell guard 34, and located a suitable distance back from said end is the chamber 12$^a$, slot 13$^a$ and recess 13$^b$ as in bell guard 34. The lip 36 may be held in a positive position as by bolting the same to bracket 37 which may be attached to the roll housing.

The recess 13$^b$ is of such length that the edges of the bent skelp have to pass over the gas issuing from slot 13$^a$ regardless of any reasonable variation in the line of travel of the tube.

Many advantages other than those heretofore enumerated will be apparent to those skilled in the art, the invention not being limited to the exact details of construction and examples of operation specified.

What is claimed as new is:

1. In apparatus for manufacturing welded tubes from heated metal strips, a bending bell through which the strip is drawn, means for subsequently pressing the edges of the strip together and welding same, and a gas-containing chambered member formed with an elongated slot which opens out sufficiently to completely cover the area of the edges of the strip in such manner as to enable the direction of a bath action of burning gas on its edges prior to being pressed together in welded relationship, said slot being disposed transversely with respect to the longitudinal axis of the strip.

2. In apparatus for manufacturing welded tubes from heated metal strips, a bending bell through which the strip is drawn, means for subsequently pressing the edges of the strip together and welding same, a gas-containing chambered member disposed between the bell and said means and formed with an elongated slot which opens out sufficiently to completely cover the area of the edges of the bent strip passing through the bell, and means for supplying a combustible gaseous medium to said chamber, said slot being disposed transversely with respect to the longitudinal axis of the strip.

3. In apparatus for manufacturing butt-welded tubes from heated metal strips, a bell through which the strip is drawn, a second bell mounted in alinement therewith, and a chambered gas-containing member formed with an elongated slot leading from said chamber and opening out adjacent the plane of travel of the strip in such manner as to completely cover the area of its edges, said slot being disposed transversely with respect to the longitudinal axis of the strip, and means for conducting a gaseous medium into said chamber.

4. In apparatus for manufacturing butt-welded tubes from heated metal strips, a bending bell through which the strip is drawn, a closing bell mounted in alinement with said bending bell for pressing the edges of the strip together in welded relation, a bell-holder for said first-named bell formed with a chamber and an elongated slot opening out below the line of travel of the strip and extending transversely with respect to the longitudinal axis thereof in such manner as to completely cover the area of its edges at a point just prior to the closing of the strip, and means for conducting a gaseous medium into said chamber.

5. In apparatus for manufacturing butt-welded tubes from heated metal strips, a bending bell and a closing bell mounted in horizontal alinement, means for drawing the strips through said bells, a bell-holder for said bending bell formed with a chamber and an elongated slot opening out below the line of travel of the edges of the strips at a point just prior to the closing of said edges, said slot extending transversely with respect to the longitudinal axis of the strips in such manner as to completely cover the area of their edges and means for conducting a gaseous medium to said chamber.

6. Apparatus for manufacturing lap-welded tubes from heated metal strips comprising, in combination, a set of welding rolls, a bell guide mounted in advance of said rolls and formed with a chamber and an elongated slot opening from said chamber out into the interior of said guide, said elongated slot being disposed transversely with respect to the longitudinal axis of the strip, and means for directing a gaseous medium into said chamber.

7. In apparatus for manufacturing lap-welded tubes from heated metal strips, a pair of co-operating bell guides one of which is formed with a chamber and an elongated slot opening out into the interior of said guide, said elongated slot being disposed transversely with respect to the longitudinal axis of the strip.

8. In apparatus for manufacturing lap-welded tubes from heated metal strips, a pair of co-operating bell guides one of which is formed with a chamber and an elongated slot opening out into a recessed portion formed on the interior of the guide, said elongated slot being disposed transversely with respect to the longitudinal axis of the strip.

9. In apparatus for manufacturing lap-welded tubes from heated metal strips, a pair of bell guides for bending the strips and a cooperating welding lip member for applying pressure to the edges of the strips, said member being formed with a gas-containing chamber and an elongated slot opening out from said chamber into the interior surface of said member, said elongated slot being disposed transversely with respect to the longitudinal axis of the strip.

10. In apparatus for manufacturing lap-welded tubes from heated metal strips, a pair of spaced bell guides for bending the strips, a co-operating welding lip member interposed between said guides and formed with a lip at its one extremity which exerts welding pressure on the edges of the strips and a chamber in advance of said lip which opens out through an elongated slot into the interior surface of said member, and means for conducting a gaseous medium to said chamber, said elongated slot being disposed transversely with respect to the longitudinal axis of the strip.

11. Apparatus for manufacturing lap-welded tubes from heated metal strips, comprising, in combination, a set of welding rolls, means for guiding strips to said rolls, a pair of said rolls for bending the strips, a welding lip member interposed between said guides and formed with a chamber and an elongated slot leading from said chamber and opening out into the interior of said bell guides and lip member, and means for conducting a combustible gas to said chamber, said elongated slot being disposed transversely with respect to the longitudinal axis of the strip.

12. Apparatus for manufacturing welded tubes from heated metal strips, comprising bending and closing bells, means for drawing the strips through said bells, a gas-containing chambered member disposed between said bells and formed with an elongated slot opening out adjacent the line of travel of the tube, means for supplying a gaseous medium to said chamber, said elongated slot being disposed transversely with respect to the longitudinal axis of the strip, and a control lever for said gas supply mounted in the line of travel of the tubes.

13. Apparatus for manufacturing welded tubes from heated metal strips, comprising a set of welding rolls, bell guides mounted in advance of said rolls, a guide trough in advance of said guides, means for drawing the strips through said guides and rolls, means for applying a gas flame to the edges of the strips as they pass through said guides and control levers for the gas supply mounted in said trough.

14. Apparatus for manufacturing welded tubes from heated metal strips, comprising a draw bench, means for drawing the tubes along said bench, bell holders on said bench, one of said holders being formed with a chamber for heating gases, said chamber having an elongated slot above said strip and disposed transversely with respect to its longitudinal axis, means for supplying gases to said chamber, and gas-control mechanism mounted on said bench and provided with a lever extending across the line of travel of the tubes.

THOMAS W. C. BEATTIE.